(12) United States Patent
Stickle et al.

(10) Patent No.: US 9,280,338 B1
(45) Date of Patent: Mar. 8, 2016

(54) DYNAMIC APPLICATION UPDATES

(71) Applicant: Amazon Technologies, Inc., Reno, NV (US)

(72) Inventors: Thomas Charles Stickle, Saint James, NY (US); Peter Klewinghaus, Baden-Württemberg (DE); Steven Reynolds Jones, Auburn, WA (US)

(73) Assignee: Amazon Technologies, Inc., Reno, NV (US)

( * ) Notice: Subject to any disclaimer, the term of this patent is extended or adjusted under 35 U.S.C. 154(b) by 27 days.

(21) Appl. No.: 13/793,876

(22) Filed: Mar. 11, 2013

(51) Int. Cl.
*G06F 9/44* (2006.01)
*G06F 9/445* (2006.01)

(52) U.S. Cl.
CPC ........................................ *G06F 8/65* (2013.01)

(58) Field of Classification Search
CPC ............... G06F 8/61; G06F 8/65; G06F 8/52; G06F 8/71; G06F 11/3624; G06F 8/443; G06F 9/45504; G06F 9/45516; G06F 9/466; G06F 11/3664; G06F 8/24; G06F 8/36; G06F 8/67
USPC .................................................. 717/170, 176
See application file for complete search history.

(56) References Cited

U.S. PATENT DOCUMENTS

| | | | | |
|---|---|---|---|---|
| 6,006,034 | A * | 12/1999 | Heath et al. | 717/170 |
| 2001/0029605 | A1* | 10/2001 | Forbes et al. | 717/11 |
| 2005/0246702 | A1* | 11/2005 | Yeh et al. | 717/170 |
| 2007/0220507 | A1* | 9/2007 | Back et al. | 717/170 |
| 2009/0328027 | A1* | 12/2009 | Tsuchiya et al. | 717/171 |
| 2011/0154313 | A1* | 6/2011 | Nolterieke et al. | 717/170 |
| 2012/0131566 | A1* | 5/2012 | Morgan et al. | 717/170 |
| 2012/0144379 | A1* | 6/2012 | Tsai | 717/170 |
| 2013/0031538 | A1* | 1/2013 | Skalsky | 717/168 |
| 2013/0346960 | A1* | 12/2013 | Gupta et al. | 717/170 |
| 2014/0026129 | A1* | 1/2014 | Powell et al. | 717/170 |
| 2014/0033189 | A1* | 1/2014 | Buswell | 717/170 |
| 2014/0059527 | A1* | 2/2014 | Gagliardi | 717/166 |
| 2014/0143767 | A1* | 5/2014 | Nigul | 717/170 |

OTHER PUBLICATIONS

Hicks et al., Dynamic Software Updating, May 2011, ACM, vol. 36 Issue 5, pp. 13-23.*
Orso et al., A Technique for Dynamic Updating of Java Software, Software Maintenance, 2002, pp. 649-658.*
Sapuntzakis et al., Virtual Appliances for Deploying and Maintaing Software, Oct. 26-31, 2003, Proceedings of the 17th Large Installation System Administration.*

* cited by examiner

*Primary Examiner* — Anna Deng
(74) *Attorney, Agent, or Firm* — Lee & Hayes, PLLC

(57) ABSTRACT

In an application runtime environment, an application may have multiple components that are loaded at or prior to execution of the application. An online storage service is used to store up-to-date versions of the components, along with a source manifest that indicates version numbers of the up-to-date versions. Upon application startup, the application retrieves the source manifest to determine whether updated versions are available. Upon identifying updated versions, the application downloads the updated versions and loads or reloads them into the runtime environment prior to initiating the main functionality of the application.

19 Claims, 3 Drawing Sheets

DYNAMIC APPLICATION UPDATES

BACKGROUND

A software application may be composed of multiple components or objects, such as modules, libraries, functions, configuration files, and so forth. In some environments, executable components may be loaded at runtime, and/or may be loaded dynamically, upon demand. Although some application components may remain static over time, other components may be changed more frequently to address bugs and to add or change features.

In certain situations, it may be desired to run a particular application on a large number of computers. For example, an enterprise may develop an application for use by employees or customers, and the application may be distributed to the computers of such employees or customers. As another example, an online service may be implemented by a large number of computers acting in concert, and each of the computers may be configured to run an instance of the same program.

Vendors and developers of widely distributed applications may desire to provide frequent application updates so that users and customers are exposed to the latest features and application releases.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items.

DETAILED DESCRIPTION

Figure 1:
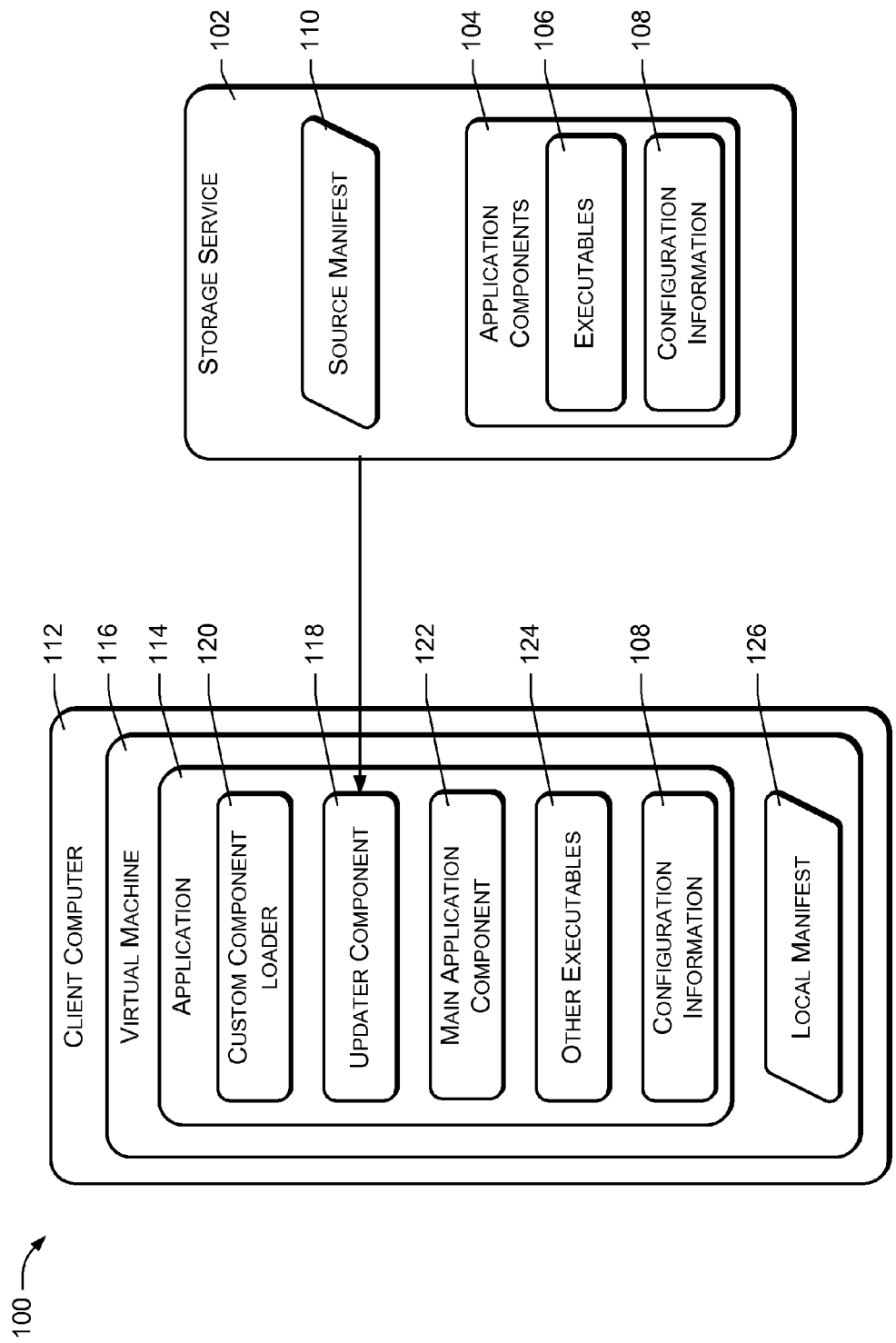
FIG. 1 is a block diagram illustrating an example computing environment and architecture in which an application may interact with a storage service to update components of the application.

This disclosure describes systems, components, and techniques that allow applications to update themselves from a central repository, particularly in situations where the applications are composed of multiple objects such as modules, libraries, and/or configuration files that are loaded by a component or class loader prior to or at runtime.

An online data repository or storage service is used to store up-to-date versions of application objects. Application objects may comprise libraries, classes, modules, programs, functions, data objects, and so forth.

A source object manifest is also stored on the data storage service. The source object manifest enumerates the available objects of an application and the version numbers of the most up-to-date objects.

The application is configured to maintain a local object manifest that specifies the version numbers of its locally and currently stored constituent objects. Executable objects of the application include a limited functionality updater component, which is configured to run upon startup of the application for the limited purpose of updating the objects of the application. Upon startup of the application, the updater component retrieves the source object manifest from the data storage service and compares the version information of the source object manifest with the version information of the local object manifest to identify any application objects that should be updated. Upon identifying application objects for which updated versions are available, the updater component retrieves the updated versions and replaces the outdated local versions with the updated versions.

The updater component has limited dependencies, while being capable of connecting to the data storage service, retrieving the source object manifest, identifying local components that need to be updated, and retrieving the updated components from the data storage service. The updater component may be executed in conjunction with a custom component loader or class loader that is configured to load only those components that are needed by the updater portion of the application.

After updating the constituent components of the application, the updater component loads and initiates the main functionality of the application, which may comprise another application component and a plurality of dependent components. When initiating the main application functionality, the custom component loader is configured to reload the components that are needed by the main application functionality, particularly those components that have been updated by the updater component.

The described techniques may be implemented by an application that executes within a virtual runtime environment such as the Java Runtime Environment (JRE). In an application such as this, the components may comprise class libraries. The updater component may comprise an updater class, and the main application functionality may be invoked by loading and initiating a main application class which serves as an entry point for the main functionality of the application. The component loader may comprise a custom Java class that overrides the built-in Java class loader.

A Java application can be updated by using these techniques without restarting the virtual environment or JRE in which the application executes. In order to perform an update, the Java application is stopped and the updater class is executed to retrieve updated components. The main application class is then invoked, and the custom class loader loads or reloads all libraries and classes used by the main functionality of the application.

FIG. 1 illustrates an example implementation 100 of an architecture in which applications may update themselves based on distribution from a storage repository such as a network-accessible object or data store.

The example implementation 100 comprises a data or data object storage service 102, which may be implemented as an online service referred to as a cloud service or cloud-based storage service. The storage service 102 may be accessible through various types of network connectivity, including private-area networks and wide-area networks such as the public Internet.

In some implementations, the storage service 102 may be part of an online or network-based computing infrastructure, which may provide a wide variety of computing resources. Such a network-based computing infrastructure may be referred to as a virtual computing infrastructure, an Infrastructure as a Service (IaaS), and/or a Platform as a Service (PaaS). Resources supported or provided by the computing infrastructure may include dedicated servers, shared servers, virtual servers, server slices, processors, processor cycles, storage, memory, and so forth. In some cases, the resources may be available in scalable increments or amounts, which can be dynamically increased or decreased in response to usage and/or demand.

The storage service 102 may be capable of storing arbitrary types of data objects, which may include data, files, programs, modules, libraries, etc. External entities may interact with the storage service 102 through APIs that are defined and exposed by the storage service. Such APIs may be used to provide data objects to the storage service 102 as well as to retrieve objects that are stored by the storage service 102. Various types of security may be provided to prevent unauthorized access to the storage service 102.

An application developer, vendor, or administrator may use the storage service 102 in accordance with the techniques described herein to distribute and provide updated software to multiple client entities, which may include computers, virtual computers, mobile computers, and other types of computing devices. Clients of the storage service 102 may use various types of communications technologies to interact with the storage service 102, including both wired and wireless technologies.

In the example shown, an administrator or developer has placed a plurality of application components 104 for storage on the storage service 102. The application components 104 may comprise multiple data objects, which may collectively form an application for distribution to and execution by client computers.

The application components 104 may include both executable components 106 and configuration information 108. The executable components 106 may comprise programs, modules, classes, libraries, routines, functions, etc., which are executable by a computer to implement the desired functionality of an application. The configuration information 108 may comprise files or other non-executable, declarative objects that define parameters relevant to operation, status, and configuration of an application.

The administrator or developer has also placed a source manifest 110 on the storage service 102. The source manifest 110 lists or enumerates the application components 104. In addition, the source manifest 110 indicates version information for the most up-to-date available versions of the application components 104.

Version information may comprise version numbers in some embodiments. For example, a particular application component 104 may have a version number of 4.5. A subsequent, updated version of the same component may have an incrementally greater version number, such as 4.6. The respective application components 104 may each have different version numbers, reflecting different sequences of updates for the various components. Different schemes may alternatively be used to indicate sequences of updates.

The administrator or developer can update an application by updating one or more of its components 104. For example, a particular executable component 106 may be updated by replacing it in the storage service 102 with a newer version. In this case, the administrator or developer also updates the source manifest 110 to update the later version number of the updated component. Thus, the storage service is maintained so that it contains the most up-to-date application components 104, and so that the source manifest 110 reflects the version numbers of the most up-to-date application components 104.

The application components 104 may be installed on a client computer or computing device 112 to form an application 114. In the described example, the application 114 and its components 104 are implemented using a general-purpose computing language such as Java, for execution by a virtual machine 116 such as a Java Virtual Machine or JVM. The virtual machine 116 may run as a service or background process on the client computer 112. In this environment, referred to as the Java Runtime Environment or JRE, the executable components 106 may comprise multiple class libraries, which may define multiple Java classes. In the Java programming environment the libraries are packaged as files, which are referred to as "jar" files.

Specific executable classes or components of the application 114 may include an updater or bootloader component 118 and a custom component loader 120, as well as a main application component 122 and other dependent executable components 124 that support the main application component and the intended functionality of the application. These executable components may be obtained from the executable components 106 shown in conjunction with the storage service 102.

In the Java environment described herein, the updater component 118 and the main application component 122 may comprise Java classes. The updater component or class 118 implements an initialization procedure that updates the components or class libraries of the application 114 from the storage service 102. The updater component 118 may be used without modification in various different types of applications to provide component update functionality. The updater component 118 is configured to have a very limited number of dependent components or classes, so that very few of the executable components 106 are needed to support operation of the updater component 118.

The main application component 122 is initiated upon completion of the updater component 118. The main application component 122 serves as an entry point for the main or developed functionality of the application 114. In the environment described herein, the main application component 122 may comprise a main Java class. The main application functionality may differ from one application to another, depending on the functionality intended by the developer of the application.

The other executable components 124, which may comprise additional classes and class libraries in the Java context, work in conjunction with the main application component 122 to support the main application functionality. The other executable components 124 may comprise dependent classes or class libraries.

The updater class or component 118 is invoked upon startup of the application 114, and implements logic for updating application components from the storage service 102. Generally, the updater component 118 works by maintaining a local object manifest 126, which lists the components of the application 104 that are present on the client computer 112, and which are referred to herein as the current or local application components. The local object manifest 126 also indicates the version numbers of the current and locally present versions of the application components. The updater component 118 compares the local manifest 126 with the source manifest 110 to determine whether there are any components of the application 114 that need to be or that can be updated. Upon identifying one or more such components, the updater component 118 retrieves those components from the storage service 102. After the components of the application 114 have been updated, the main application component 122 is invoked to execute in conjunction with the updated components, to provide the main functionality of the application 114.

The updater component 118 may be implemented as a minimal set of program components or classes, which are capable of communicating with the storage service 102 and retrieving the source manifest 110 and application components 104. The updater component 118 works in conjunction with the custom component loader 120, which is configured during execution of the updater component 118 to load only the minimal set of components or classes needed by the updater component 118. Thus, during the initialization performed by the updater component 118, the custom component loader 120 does not load all of the Java libraries or classes that will be needed by the application 114. Rather, the custom component loader 120 loads only those classes that are needed by the updater component 118.

Upon completion of the update process by the updater component 118, the updater component 118 invokes the main application component 122. The main application component 122 implements the main functionality of the application 114 in conjunction with the other executables 124, which may comprise dependent Java classes. At this point, upon initiation and during execution of the main application component 122 and its dependent components, the custom component loader 120 is configured to load any further application components, such as libraries and classes, which may be needed by execution of the main application component 122 and its dependent executable components 124. Furthermore, the custom component loader 120 is configured to dynamically reload any application components that have been updated by the update process. In some embodiments, the custom component loader 120 may be configured to reload all application components that are used by or dependent from the main application component 122. Reloading comprises removing or clearing existing versions of components from the memory or heap of the virtual machine and replacing the versions with updated or current versions.

This configuration of the custom component loader 120 allows the application 114 to update its constituent components without requiring the virtual machine 116 to be restarted. To perform an update, the application 114 is stopped and the updater component 118 is invoked to update any application components 104 for which newer versions are available. The main application component 122 is then re-invoked, and the custom component loader 120 reloads the components of the application 114 as appropriate to ensure that the components updated from the storage service 102 are queued and/or loaded into execution memory of the virtual machine 116.

By implementing the application 114 in this manner, multiple instances of the application 114, executing on behalf of different customers and on different computers and different virtual machines, may obtain updates from a common source. Updates may be performed quickly and efficiently, because only those components that have actually been updated need to be retrieved from the storage service. In addition, applications may be updated without restarting the virtual machine environment within which they are executing.

From the perspective of an application designer, distributor, or vender, software updates may be applied by simply storing updated components in the storage service 102 and updating the source manifest 110.

Figure 2:
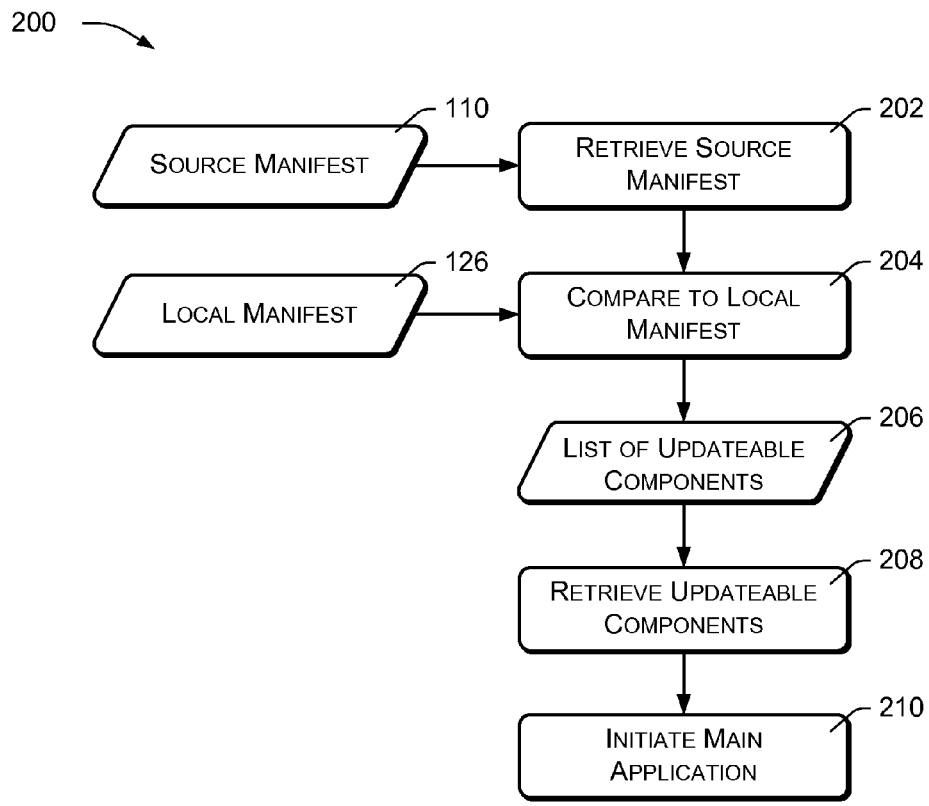
FIG. 2 is a flow diagram illustrating an example of how the application of FIG. 1 may obtain updated components from a storage service.

FIG. 2 illustrates an example of an update process 200 that may be performed by the updater component 118. Although the process 200 is described with reference to the environment of FIG. 1, the process 200 may also be performed in other environments.

An action 202 comprises obtaining or retrieving the source manifest 110 from a source repository such as the online storage service 102. The source manifest 110 indicates up-to-date versions or version numbers of the components of the application 114.

An action 204 comprises comparing the source manifest 110 to the local manifest 126 maintained by the application 114. Specifically, the versions or version numbers indicated by the source and local manifests are compared to identify any components for which the source manifest indicates a higher or later version number than the local manifest. The action 204 results in a list of updateable components 206.

An action 208 comprises obtaining, downloading, or retrieving the updated versions of the identified updateable components from the storage service 102. Older or out-of-date versions on the client computer 112 are replaced by the corresponding newer, updated, or up-to-date versions.

An action 210 comprises invoking or initiating the main application component 122, upon completion of the updating performed by the updater component 118.

Figure 3:
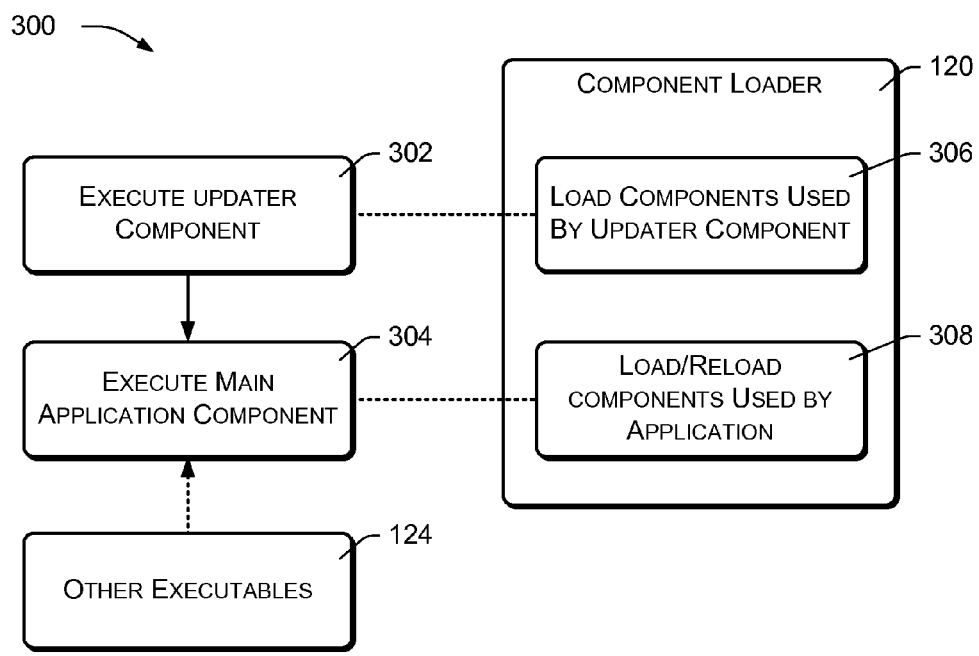
FIG. 3 is a flow diagram illustrating example operation of the application of FIG. 1, including operation of a component loader that operates in conjunction with the application.

FIG. 3 illustrates an example of an overall process 300 that is used to update the application 114 and to invoke the main functionality of the application 114. FIG. 3 also illustrates operation of the component loader 120 when used in conjunction with the updater component 118 and the main application component 122.

An action 302 comprises invoking and executing the updater component 118, which is configured to identify and retrieve updateable components of the application. Upon completion of the updater component 118, the main application component 122 is initiated to invoke and execute the main application component, which provides the main functionality of the application. The main application component 122 may in turn utilize other, dependent executable components 124.

The component loader 120 may be implemented as a custom class loader in the Java Runtime Environment. More specifically, the component loader 120 may be implemented as a custom class that overrides the built-in Java class loader class. The component loader 120 is customized for different operational behavior depending on whether the updater component 118 or main application component 122 is running.

During execution of the updater component 118 in the action 302, the component loader 120 is configured to perform an action 306 of loading only those classes or components that are used or needed by the updater component 118. The updater component 118 is designed to utilize a very limited set of dependent classes, and the component loader 120 therefore loads only this limited set of classes.

After or upon initiation of the main application component 122 in the action 304, the component loader 120 is configured to perform an action 308 of loading any of the other executable components 124 that are used or needed to implement the main functionality of the application, including any of the other executable components 124 that depend from the main application component 122. In addition, the component loader 120 is configured to reload either all application components or any of application components that have been updated by the updater component 118. Thus, upon initiation of the main application component at 304, all of the most recent version of the application components 104 have been loaded into the virtual machine 116.

In some embodiments, the component loader 120 may be replaced by two component or custom class loaders, one of which is configured to function at or during execution of the updater component and another of which is configured to function at or during execution of the main application component.

Figure 4:
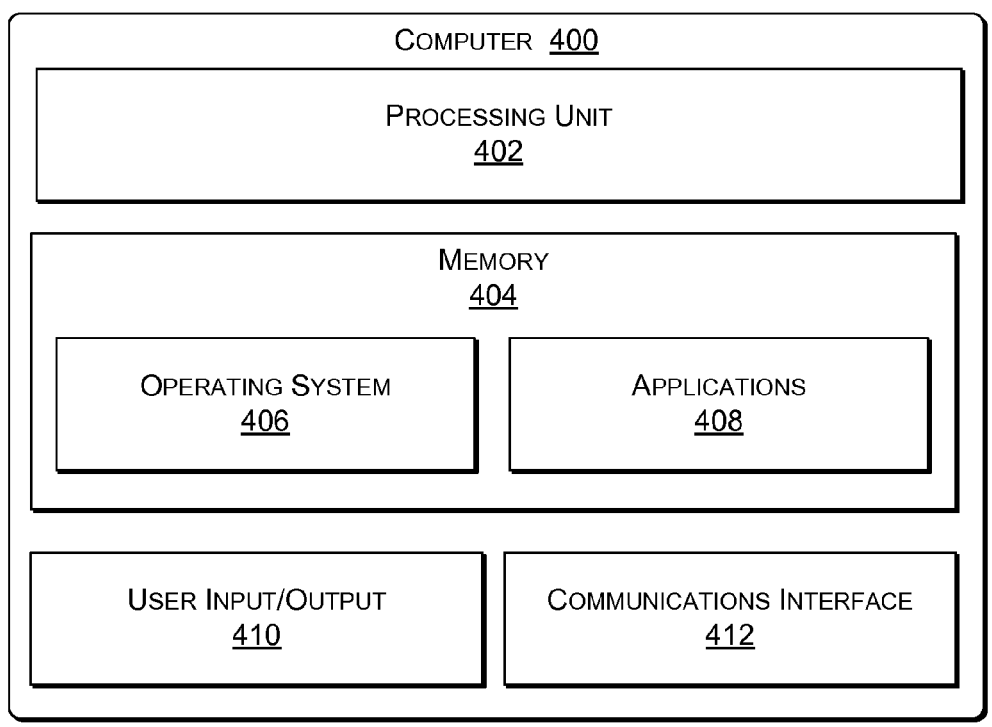
FIG. 4 is a block diagram showing high-level components of an example computer that may be used to implement the systems and techniques described herein.

FIG. 4 shows relevant components of an example computer 400 that may be used to implement the various techniques described above, including those performed by the client computer 112 and those performed by the storage service 102. The example computer 400 may comprise one or more processing units 402 and one or more forms of computer-readable memory 404. The memory 404 may comprise volatile and nonvolatile memory. Thus, the memory 404 may include, but is not limited to, RAM, ROM, EEPROM, flash memory, or other memory technology, or any other medium which can be used to store applications and data. The memory 404 may also include removable media such as optical disks, portable devices/drives, and so forth.

The memory 404 may be used to store any number of functional components, such as programs and program modules that are executable on the processing unit 402. For example, the memory may store an operating system 406 and various applications or user-specified programs 408. The operating system 406 and/or the user-specified programs 408 may include components, modules, and/or logic for performing the actions described herein. More specifically, executable components stored in the memory 404 may comprise computer-executable instructions that, when executed, cause the one or more processing units 402 to perform acts and to implement techniques described herein.

The computer 400 may also have user input/output components 410, such as a display, keyboard, mouse, etc. The computer 400 may also comprise a communications interface 412 such as a network interface.

Generally, the functionality described herein may be implemented by one or more computers such as shown by FIG. 4 or by similar devices, with the various actions described above distributed in various ways across the different computers. Computers of the storage service 102 may be located together or separately, and organized as virtual servers, server banks, and/or server farms. The described functionality may be provided by the computers of a single entity or enterprise, or may utilize the computers and/or services of multiple entities or enterprises.

The environment and individual elements described herein may of course include many other logical, programmatic, and physical components, of which those shown in the accompanying figures are merely examples that are related to the discussion herein.

The various techniques described herein are assumed in the given examples to be implemented in the general context of computer-executable instructions or software, such as program modules, that are stored in computer-readable storage and executed by the processor(s) of one or more computers or other devices such as those illustrated in the figures. Generally, program modules include routines, programs, objects, components, data structures, etc., and define operating logic for performing particular tasks or implement particular abstract data types.

Other architectures may be used to implement the described functionality, and are intended to be within the scope of this disclosure. Furthermore, although specific distributions of responsibilities are defined above for purposes of discussion, the various functions and responsibilities might be distributed and divided in different ways, depending on circumstances.

Similarly, software may be stored and distributed in various ways and using different means, and the particular software storage and execution configurations described above may be varied in many different ways. Thus, software implementing the techniques described above may be distributed on various types of computer-readable media, not limited to the forms of memory that are specifically described.

Furthermore, although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. One or more non-transitory computer-readable media storing computer-executable instructions of an application, wherein the application has multiple components, and wherein the computer-readable instructions of the application are executable by one or more processors to perform acts comprising:

maintaining a local manifest that indicates version information of current versions of the multiple components of the application, wherein the multiple components of the application includes an updater component, a main application component, one or more other executable components, and a component loader, wherein the application is executed within a virtual machine;

executing the main application component to provide main functionality of the application;

subsequent to executing the main application component, stopping the main application component to update one or more of the multiple components of the application;

subsequent to stopping the main application component, loading, by the component loader, the updater component, and starting execution of the updater component;

obtaining, by the updater component, a source manifest from a network-accessible storage service, wherein the source manifest indicates version information of available versions of the multiple components of the application;

comparing, by the updater component, the version information of the local and source manifests to identify a component of the application for which an updated version is available from the network-accessible storage service;

retrieving, by the updater component, the updated version of the identified component of the application from the network-accessible storage service to update the identified component of the application;

subsequent to updating the identified component of the application, re-loading, by the component loader, the main application component to provide the main functionality of the application, wherein the main application component is not executed while the updater component performs the obtaining, comparing, and retrieving, wherein re-loading the main application component comprises:

clearing an older version of the identified component of the application from a heap of the virtual machine, loading the updated version of the identified component of the application for execution in conjunction with the application, and storing the updated version of the identified component of the application in the heap of the virtual machine, wherein the component loader is configured to override a built-in Java class loader class associated with the virtual machine.

2. The one or more non-transitory computer-readable media of claim 1, wherein the local and source manifests identify multiple individual class libraries and version information corresponding to each of the respective class libraries.

3. The one or more non-transitory computer-readable media of claim 1, the acts further comprising:

during execution of the updater component, loading components of the application that are used in the obtaining, comparing, and retrieving;

while executing the main application component, refraining from loading or executing the components of the application that are used in the obtaining, comparing, and retrieving; and during execution of the updater component, refraining from loading components of the application that are not used in the obtaining, comparing, and retrieving.

4. The one or more non-transitory computer-readable media of claim 1, wherein the component loader is configured to reload any components retrieved by the updater component.

5. The one or more non-transitory computer-readable media of claim 4, wherein the component loader is further configured during execution of the updater component to load components of the application that are used by the updater component and to refrain from loading components of the application that are not used by the updater component.

6. The one or more non-transitory computer-readable media of claim 1, wherein the application is executed within the virtual machine of a computing device.

7. The one or more non-transitory computer-readable media of claim 1, wherein:
the components of the application comprise Java class libraries; and
the local and source manifests identify the Java libraries and version information corresponding to each of the respective class libraries.

8. The one or more non-transitory computer-readable media of claim 1, wherein the components of the application comprise one or more of:
executable objects; or
declarative configuration objects.

9. The one or more non-transitory computer-readable media of claim 1, wherein the version information comprises version numbers.

10. The one or more computer-readable media of claim 1, wherein the main application component serves as an entry point for a main or developed functionality of the application.

11. The one or more computer-readable media of claim 1, wherein prior to stopping the main application component, the updater component is not being executed.

12. A method performed by an application having multiple components, comprising:
maintaining a local manifest that indicates version information of current versions of the multiple components of the application;
executing a main application component of the application, wherein the application is executed within a virtual machine;
subsequent to executing the main application component, stopping the main application component to update one or more of the multiple components of the application;
subsequent to stopping the main application component, loading, by a component loader of the application, a first of the multiple components, wherein the first of the multiple components is configured to update the application by performing acts comprising:
obtaining a source manifest from a source repository, wherein the source manifest indicates version information of available versions of the multiple components of the application;
identifying one or more components of the application for which updated versions are available from the source repository, based at least in part on comparison of version information within the source manifest with the version information within the local manifest;
retrieving the updated versions of the identified one or more components of the application from the source repository to update the identified one or more components of the application; and
subsequent to updating the identified one or more components of the application, re-loading, by the component loader, the main application component that provides main functionality of the application, wherein the main application component depends on the one or more identified components of the application, wherein the main application component is not executed while the first of the multiple components performs the obtaining, identifying, and retrieving, wherein re-loading the main application component comprises:
clearing an older version of the identified one or more components of the application from a heap of the virtual machine,
loading the updated version of the identified one or more components of the application for execution, and
storing the updated version of the identified one or more components of the application in the heap of the virtual machine,
wherein the component loader is configured to override a built-in Java class loader class associated with the virtual machine.

13. The method of claim 12, wherein the source manifest identifies multiple individual class libraries and version information corresponding to each of the respective class libraries.

14. The method of claim 12, further comprising, during execution of the first of the multiple components, loading components of the application used by the first of the multiple components and refraining from loading components of the application not used by the first of the multiple components.

15. The method of claim 12, wherein the identified one or more components of the application comprise multiple Java class libraries.

16. The method of claim 12, wherein the components of the application comprise Java class.

17. A computer device, comprising:
a processing unit;
a hardware memory;
a runtime environment;
an application configured to execute within the runtime environment, wherein the application comprises multiple class libraries having executable classes;
the executable classes including an updater class that is configured to retrieve updated versions of the multiple class libraries from a repository;
the multiple class libraries further including a main class that is configured to initiate main functionality of the application in conjunction with other classes of the multiple class libraries;
a local manifest that indicates version information of a current version of the multiple class libraries;
one or more class loaders being configured to identify one or more classes of the multiple class libraries for loading into the runtime environment;
the one or more class loaders being configured to perform acts comprising:
stopping execution of the main class,
subsequent to stopping execution of the main class, starting execution of the updater class,
wherein the updater class is configured to perform acts comprising:
obtaining a source manifest from the repository, wherein the source manifest indicates version information of available versions of the multiple class libraries, identifying one or more of class libraries of the multiple class libraries for which updated versions are available from the source repository, based at least in part on comparison of the version information within the source manifest with the version information within the local manifest, loading at least one class of the multiple class libraries that is used to retrieve the updated versions of the identified one or more class libraries, retrieving the updated versions of the identified one or more class libraries from the repository, refraining from loading other classes of the multiple class libraries that are not used to retrieve the updated versions of the identified one or more class libraries;

subsequent to executing the updater class to update the identified one or more class libraries, re-executing the main class, wherein the main class is not executed while the updater class performs the obtaining, identifying, and retrieving;

wherein re-executing the main class comprises:
  loading classes of the multiple class libraries that are used to provide the main functionality of the application,
  clearing an older version of the identified one or more class libraries from the repository,
  loading the updated version of the identified one or more class libraries for execution in conjunction with the main class, and
  storing the updated version of the identified one or more class libraries in the repository, and
wherein the one or more class loaders is configured to override a built-in Java class loader class associated with a virtual machine on which the application is being executed.

18. The computer device of claim 17, wherein the one or more class loaders are further configured during execution of the main class to reload classes contained in class libraries that have been updated by the updater class.

19. The computer device of claim 17, wherein the repository is accessible to multiple instances of the application.

* * * * *